(12) United States Patent
Day et al.

(10) Patent No.: US 10,450,060 B2
(45) Date of Patent: Oct. 22, 2019

(54) ELASTOMERIC BEARING WITH TAB FOR THERMOCOUPLE AND SYSTEM FOR USE

(71) Applicant: Bell Helicopter Textron Inc., Fort Worth, TX (US)

(72) Inventors: Clifton B. Day, Weatherford, TX (US); Frank B. Stamps, Colleyville, TX (US); Jason Hoyle, Mansfield, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 636 days.

(21) Appl. No.: 15/229,461

(22) Filed: Aug. 5, 2016

(65) Prior Publication Data

US 2018/0037318 A1 Feb. 8, 2018

(51) Int. Cl.
| | |
|---|---|
| *B64C 27/35* | (2006.01) |
| *B64D 43/00* | (2006.01) |
| *B64C 29/00* | (2006.01) |
| *B64C 27/14* | (2006.01) |
| *B64D 45/00* | (2006.01) |

(52) U.S. Cl.
CPC .............. *B64C 27/35* (2013.01); *B64C 27/14* (2013.01); *B64C 29/0033* (2013.01); *B64D 43/00* (2013.01); *B64D 45/00* (2013.01); *B64D 2045/0085* (2013.01)

(58) Field of Classification Search
CPC ....... B64C 27/35; B64C 27/14; B64C 27/006; B64C 27/32; B64C 29/0033; B64D 45/00; B64D 43/00; B64D 2045/0085; F04D 27/001; F05B 2260/83
USPC ........... 267/140.4, 141.2, 278–282, 292–294
See application file for complete search history.

(56) References Cited

U.S. PATENT DOCUMENTS

| | | | | |
|---|---|---|---|---|
| 4,278,881 A | * | 7/1981 | Mann | F16C 17/24 250/227.21 |
| 4,357,057 A | * | 11/1982 | Peterson | B64C 27/35 384/125 |
| 5,381,692 A | * | 1/1995 | Winslow | G01M 13/045 340/682 |
| 5,449,152 A | * | 9/1995 | Byrnes | B64C 27/51 267/141.1 |
| 5,691,707 A | * | 11/1997 | Smith | F16C 33/6622 184/108 |
| 6,093,001 A | * | 7/2000 | Burgreen | F04D 29/0467 415/176 |
| 6,140,720 A | * | 10/2000 | Certain | B64C 27/35 310/43 |
| 6,236,328 B1 | * | 5/2001 | Smith | G01M 13/045 184/108 |
| 7,686,584 B2 | | 3/2010 | Schmaling | |
| 7,688,218 B2 | * | 3/2010 | LeFebvre | B61K 9/00 340/682 |
| 9,334,048 B2 | * | 5/2016 | Burnett | F16F 1/41 |
| 2012/0257847 A1 | * | 10/2012 | Allred | B64C 27/35 384/221 |

(Continued)

*Primary Examiner* — Carlos A Rivera
*Assistant Examiner* — Wayne A Lambert
(74) *Attorney, Agent, or Firm* — Lightfoot & Alford PLLC (57) ABSTRACT

A laminated elastomeric bearing has layers of elastomeric material and layers of metal. A tab is located on a periphery of one of the layers of metal and protrudes from the bearing. A thermoelectric device is coupled to the tab, and heat generated within the bearing during use is conducted to the tab and to the thermoelectric device, allowing for measurement of the heat.

21 Claims, 8 Drawing Sheets

(56) References Cited

U.S. PATENT DOCUMENTS

2013/0084193 A1* 4/2013 Beers ................... F04D 17/12
   417/44.1
2016/0091017 A1* 3/2016 Mueller ................ F16C 17/22
   384/125

* cited by examiner

ELASTOMERIC BEARING WITH TAB FOR THERMOCOUPLE AND SYSTEM FOR USE

BACKGROUND

Elastomeric bearings are used to allow limited relative motion of mechanical components, such as those in aircraft rotor hubs. One type of elastomeric bearing is a laminated bearing, comprising bonded alternating layers of elastomeric material and a stiff material, such as a metal. These bearings can withstand high axial loads and oscillation, and they offer long life, no lubrication requirement, and failsafe operation.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Mechanical components used in aircraft, road vehicles, and other applications may require bearings for allowing relative motion of the components. For example, spherical laminated elastomeric bearings are often used for rotor hubs in rotary-wing aircraft, such as for allowing the yoke to gimbal relative to the mast. These elastomeric bearings can build up heat during operation, and this can be exacerbated when the aircraft is operated in high-temperature environments.

This disclosure divulges a laminated elastomeric bearing with a tab conductively coupled to and extending from one of the metal layers. This allows for mounting a thermocouple to the tab for measuring the internal temperature of layers within the bearing. In addition, a system for measuring the internal heat and utilizing the data is disclosed.

Figure 1:
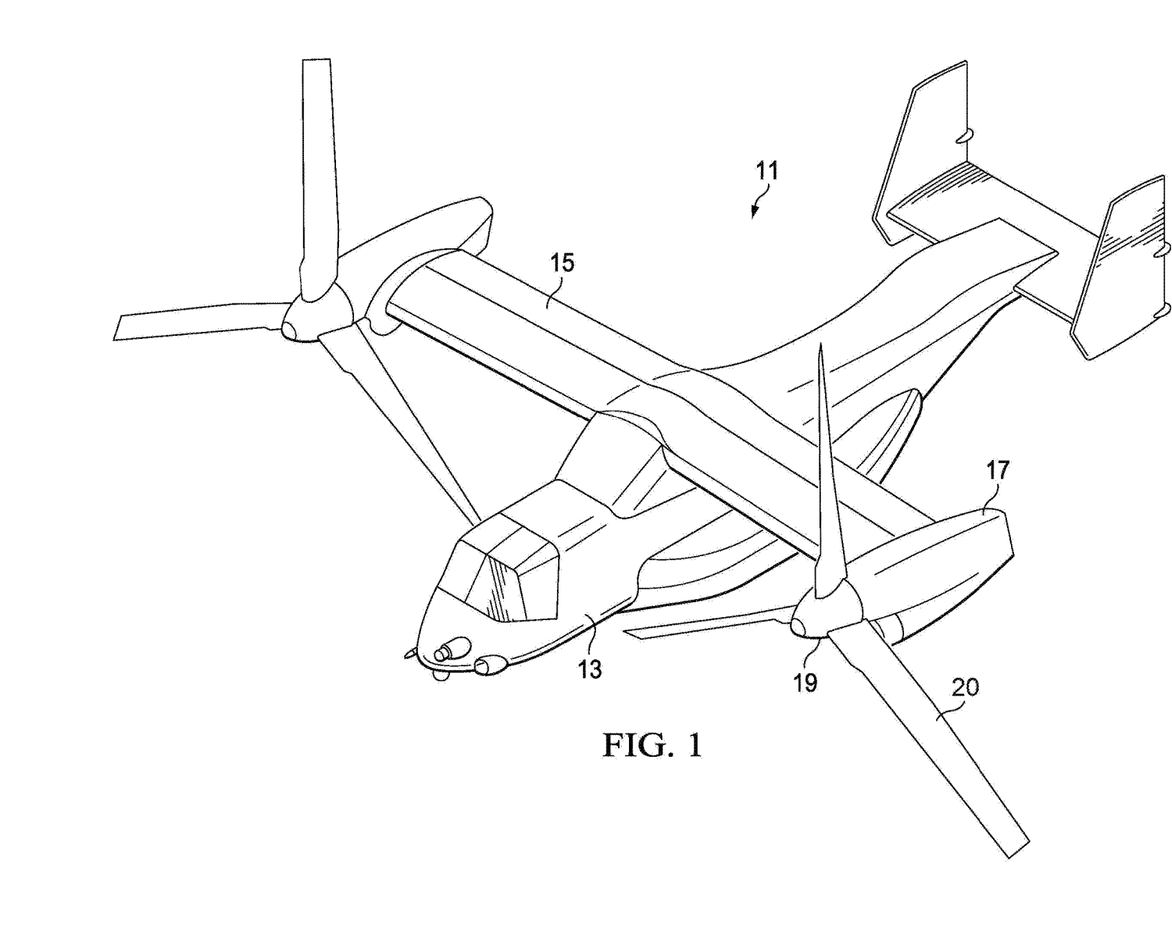
FIG. 1 is an oblique view of an aircraft comprising elastomeric bearings according to this disclosure.

FIG. 1 illustrates an aircraft 11 comprising elastomeric bearings according to this disclosure. Aircraft 11 comprises a fuselage 13, transverse wing 15, and rotatable nacelles 17 at opposing ends of wing 15. Each nacelle 17 houses an engine (not shown) for causing rotation of an associated rotor hub assembly 19. In the embodiment shown, each rotor hub assembly 19 is configured for supporting three blades 20.

Figure 2:
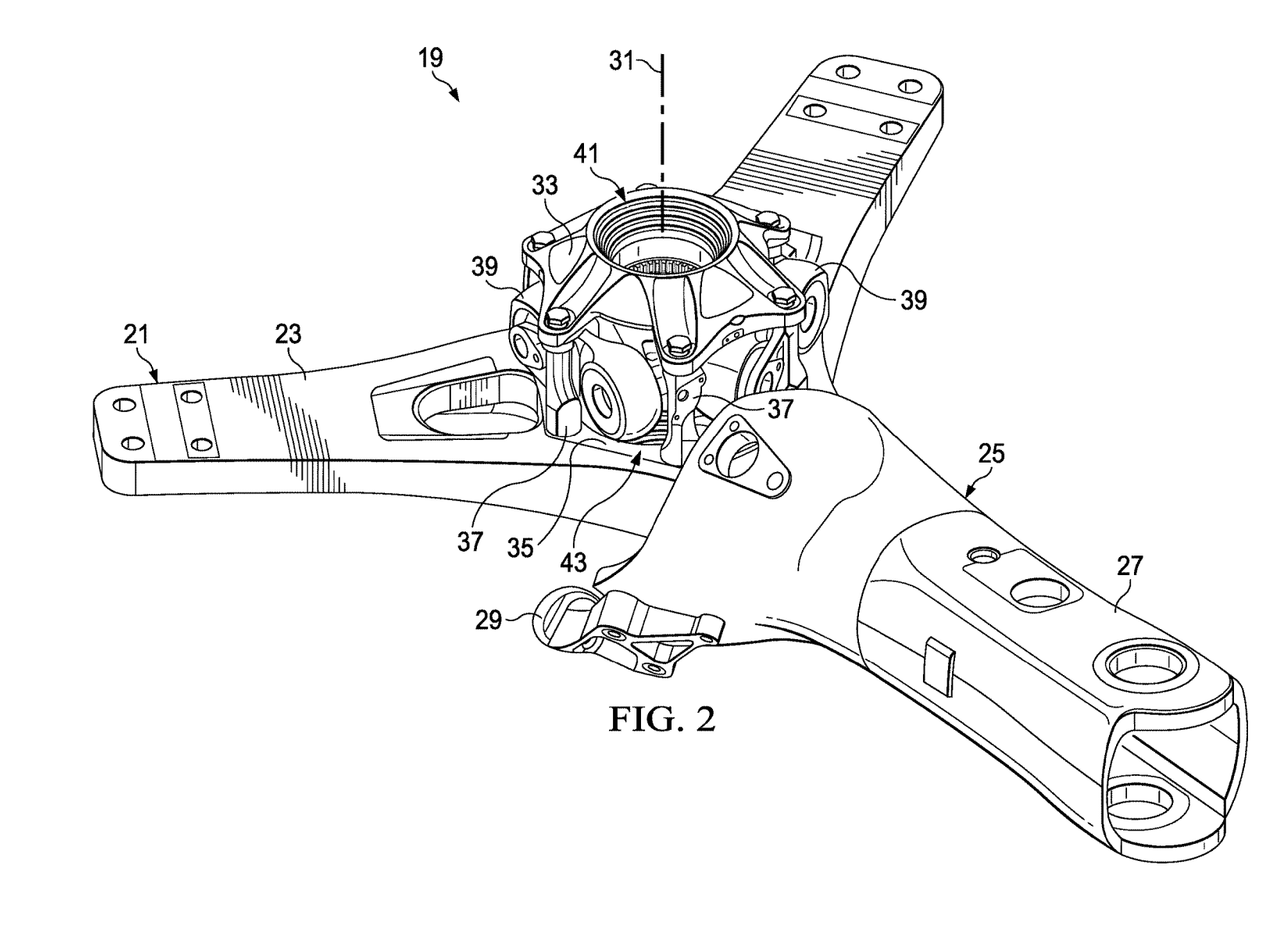
FIG. 2 is an oblique view of components of a rotor hub incorporating elastomeric bearings according to this disclosure.
Figure 3:
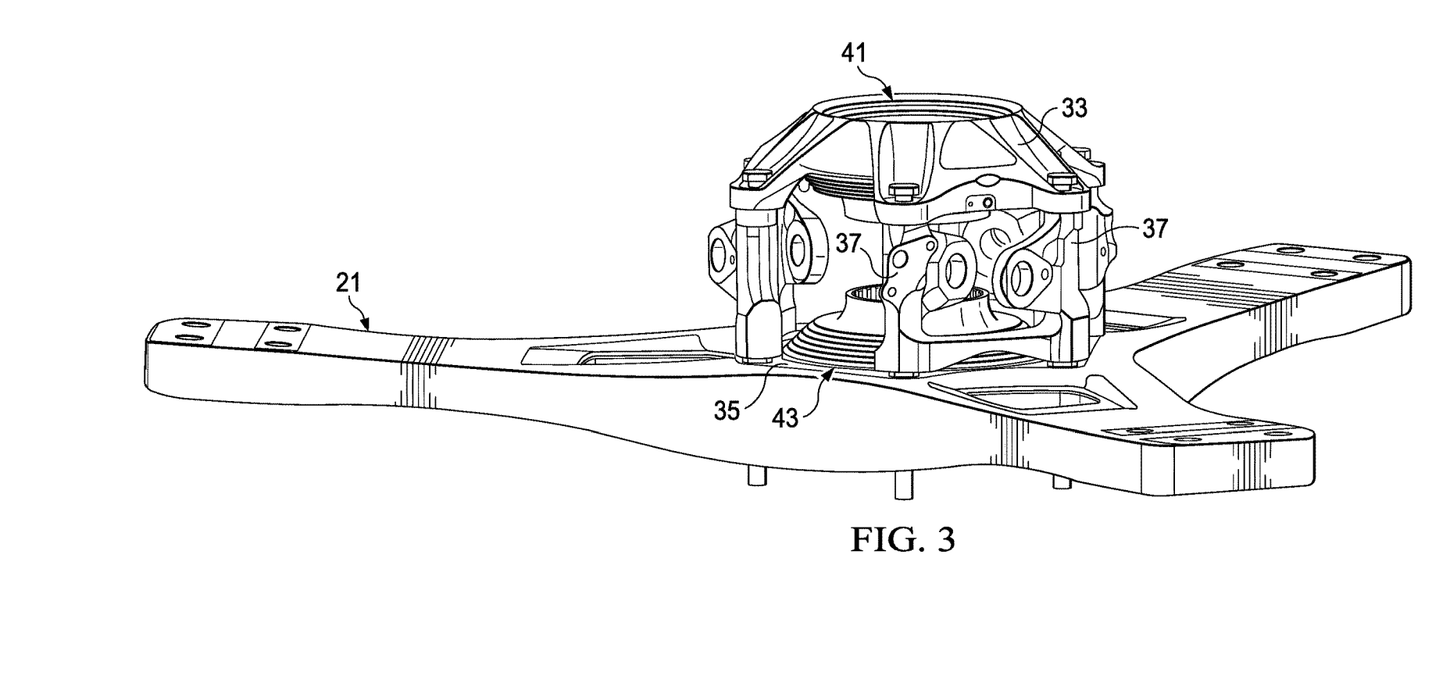
FIG. 3 is an oblique view of the rotor hub of FIG. 2 with components removed for ease of viewing.
Figure 4:
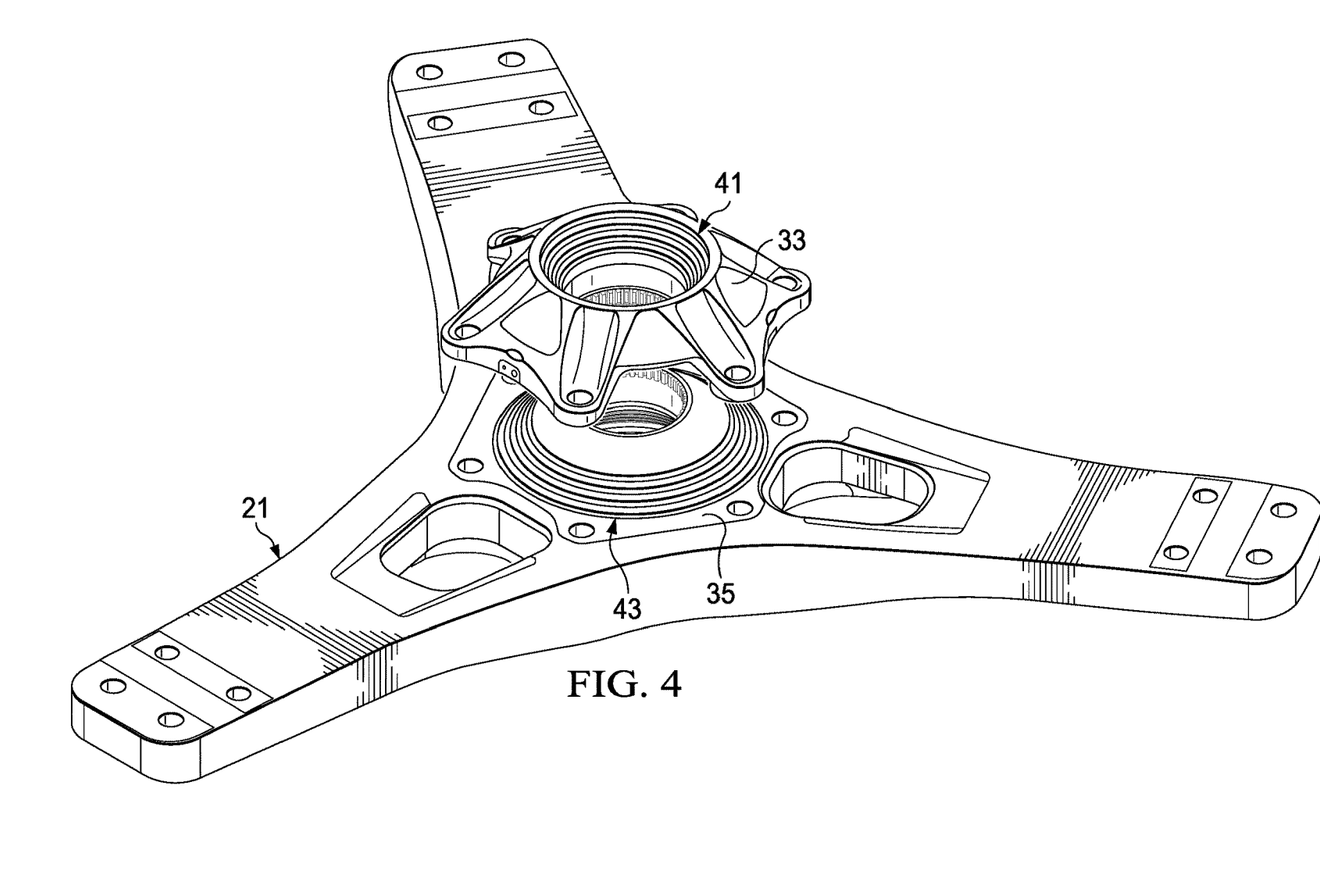
FIG. 4 is an oblique view of the rotor hub of FIG. 2 with additional components removed for ease of viewing.

FIG. 2 through 4 are oblique views of components of rotor hub assembly 19, which incorporates elastomeric bearings according to this disclosure. Rotor hub assembly 19 comprises a yoke 21 having three arms 23 extending radially outward from a central portion of yoke 21. A blade grip 25 (one shown) is pivotally attached to each arm 23, each grip 25 having a blade attachment portion 27 and a pitch horn 29. Yoke 21 is driven in rotation about axis 31 by a driveshaft (not shown) that engages a central splined drive hub (not visible). The drive hub is connected to an outer bearing plate 33 and an inner bearing plate 35 through three pairs of clevis members 37, each pair forming a clevis. The leading end of each of three drive links 39 is connected to the drive hub, and the trailing end of each link 39 is connected to the clevis formed by an associated pair of clevis members 37. Inner bearing plate 35 is mounted to yoke 21, providing a path for torque to be transferred from the driveshaft into the drive hub, through the drive hub into links 39, through links 39 into clevis members 37, and through clevis members 37 into inner bearing plate 35 and yoke 21 for driving blades 20 in rotation about axis 31.

Rotor hub assembly 19 allows for gimballing, or pivoting, of yoke 21 relative to mast axis 31, and an outer elastomeric bearing 41 and an inner elastomeric bearing 43 provide a centering force and react loads from yoke 21. Bearings 41, 43 are laminated elastomeric bearings, as described above, comprising alternating bonded layers of elastomer and metal. Bearing 41 is fixedly mounted in outer bearing plate 33, and bearing 43 is fixedly mounted in inner bearing plate 35.

Figure 5:
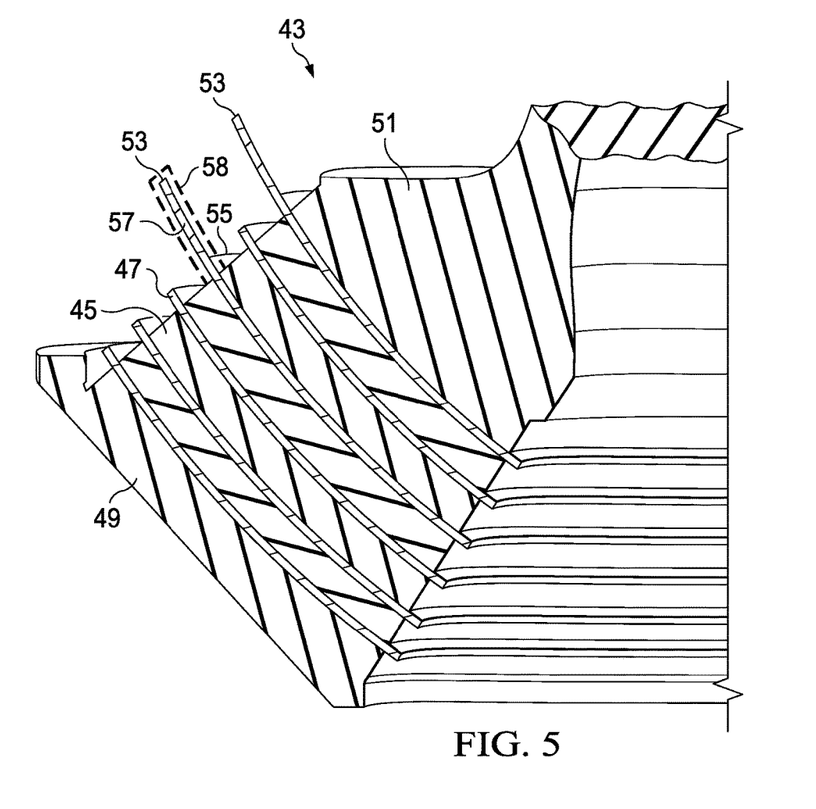
FIG. 5 is a side cross-sectional view of a portion of an elastomeric bearing of the rotor hub of FIG. 2.

FIG. 5 is a side cross-section view of a portion of bearing 43, which is constructed similarly to bearing 41. Bearings 41, 43 comprise alternating elastomeric layers 45 and metal layers 47, each layer 45, 47 being bonded to the adjacent layers 45, 47. An outermost elastomeric layer 49 is bonded to the associated bearing plate 33, 35, whereas an inner elastomeric layer 51 engages the mast. In this manner, bearings 41, 43 act as spherical gimbal bearings, with elastic deformation occurring in the elastomeric layers 45 relative to each other and to metal layers 47.

During operation, deformation of elastomeric layers 45 causes heating within bearings 41, 43 due to viscoelastic damping, and excessive heating can lead to damage or failure of bearings 41, 43. This heating can be exacerbated if aircraft 11 is operating in high-temperature environmental conditions. Furthermore, elastomers are insulators, so heat is readily dissipated only by conduction through metal layers 47 to the ambient air surrounding bearings 41, 43.

Because of these concerns about excessive heat buildup within bearings 41, 43, it is necessary to operate the aircraft in a manner that maintains the level of heat below a selected maximum or within a selected range. For example, the Bell Boeing V-22 Osprey tiltrotor aircraft, which uses gimbaled rotors like those described above, must be operated in a way that minimizes excessive gimbaling of the rotors during flight. On current aircraft, a parametric system uses a heating equation and the measured motion of the rotors to estimate the internal heating in the bearings of the rotors and alerts crewmembers, via a Cruise Guide Indicator, when the operating conditions will cause expected heating to exceed a specified maximum. Once alerted, crewmembers may alter the operating conditions to prevent excessive heat buildup, such as by limiting swashplate tilt during cruise flight. An additional system for in-flight measurement of the actual level of heat within bearings 41, 43 would augment the parametric system as a feedback loop.

Figure 6:
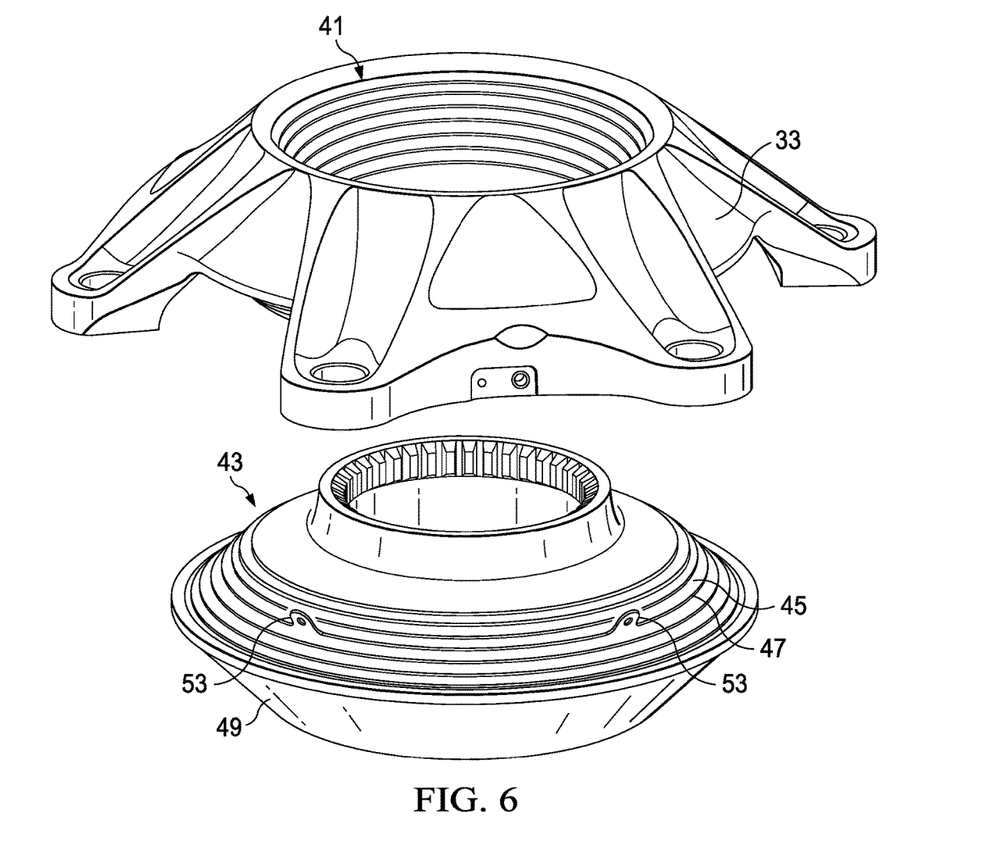
FIG. 6 is an oblique isolated view of elastomeric bearings of the rotor hub of FIG. 2.
Figure 7:
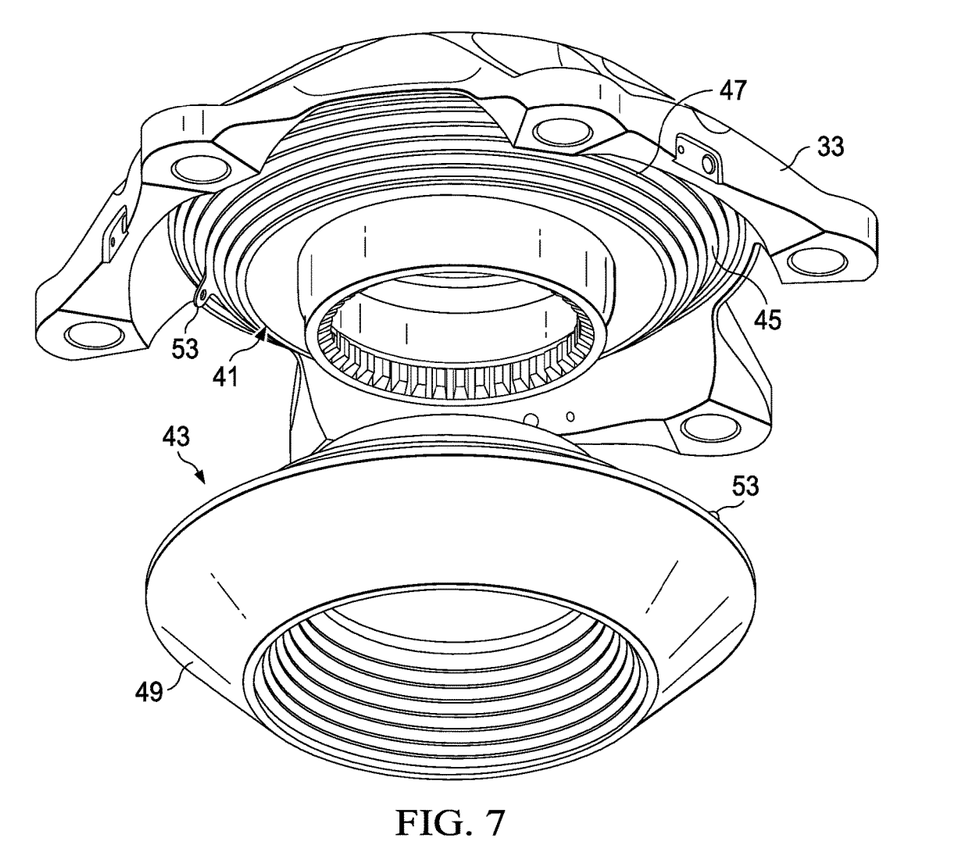
FIG. 7 is another oblique isolated view of the elastomeric bearings of FIG. 6.

To allow for direct measurement of the temperature within bearings 41, 43, at least one tab 53 is located on a peripheral portion 55 of at least one of metal layers 47 and protrudes from the associated elastomeric bearing 41, 43, as shown in FIGS. 5 through 7. Tab 53 may be formed as an integral portion at the periphery of metal layer 47, or tab 53 may be a separate component formed from a heat-conducting material and attached to peripheral portion 55 for thermal conduction of heat from metal layer 47. Tab 53 is preferably a planar component and preferably has a hole 57 formed therein, and tabs 53 may be located at any appropriate angular position on bearings 41, 43. As shown in FIG. 5 on one of tabs 53, each tab 53 is preferably insulated by an insulator 58 from ambient conditions, such as air flow or external sources of heat, to prevent heat loss or gain in tabs 53. At least one tab 53 can be located on each of multiple metal layers 47, as shown in FIG. 5, and multiple tabs 53 can be used on one metal layer 47, as shown in FIG. 6.

Each tab 53 allows for a thermoelectric device, such as a thermocouple (FIG. 8), to be coupled to tab 53 and provide for direct measurement of heat conducted to tab 53 through the associated metal layer 47 from within bearing 41, 43. Tabs 53 are necessary for measurement of heat, as a thermoelectric device would not survive within bearings 41, 43 due to the straining of elastomeric layers 45. The optimum location for each tab 53 is one that positions tabs 53 to measure heat in areas of elastomeric layers 45 that have the highest shear modulus and highest actual strain level.

Figure 8:
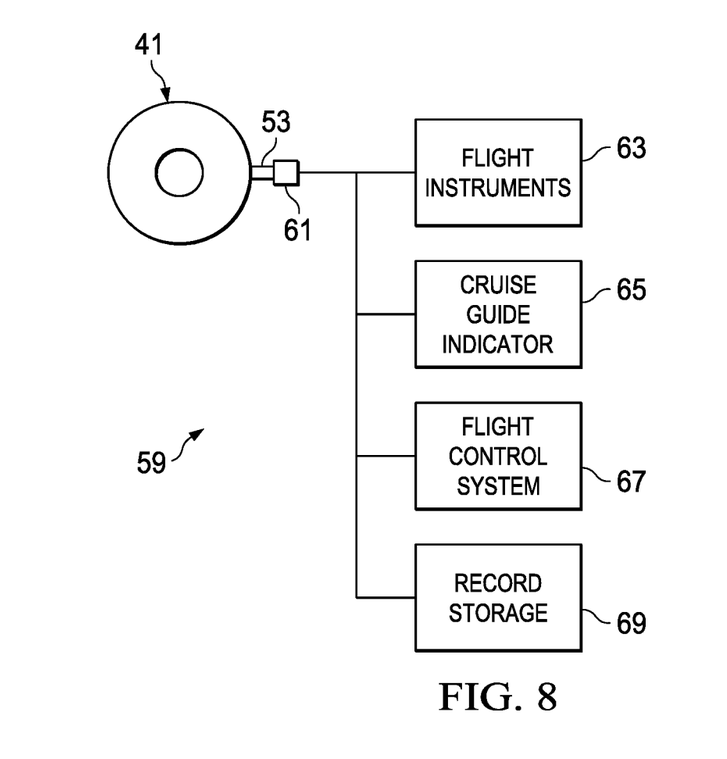
FIG. 8 is a schematic view of a system for use with the elastomeric bearings of FIG. 6.

FIG. 8 illustrates a system 59 for measuring heat within an elastomeric bearing, such as bearing 41, and the same system or a separate system can also be used to measure heat within bearing 43. System 59 comprises an elastomeric bearing, which is represented here by bearing 41, a tab 53 in thermal conduction with a metal layer (not shown) of bearing 41, a thermoelectric device 61, such as a thermocouple, in thermal communication with tab 53, and at least one electronic aircraft system. Heat generated within bearing 41 is conducted through a metal layer to an associated tab 53, and this heat is then conducted to device 61, which generates a signal associated with a temperature value indicating the measured level of heat. This signal may be a signal proportional to the temperature value, such as a varying voltage, or may be a temperature value determined by an on-board electronic system.

As shown in the schematic view of FIG. 8, the signal is then communicated to other aircraft systems, which may include, for example, a flight instruments system 63, a Cruise Guide Indicator 65, a flight control system (FCS) 67, and a record storage system 69. Flight instruments system 63 may be configured to, in response to the signal, provide an indication of the temperature value to a crewmember of the aircraft. This indication may be, for example, through visual or audible means, such as a cockpit display showing the temperature value or a visual or audible warning when the temperature value is approaching or has exceeded a specified maximum.

One specific instrument system that may be used is the Cruise Guide Indicator 65, as discussed above, which warns crewmembers that the flight configuration of the aircraft can cause or is causing excessive swashplate tilt in the rotors during cruise flight. This condition can lead to excessive heat buildup in the elastomeric bearings of the rotors and to damage or destruction of the bearings.

The signal may also be communicated to FCS 67, which is an electronic system that is configured to command at least some flight controls of the aircraft. FCS 67 can command flight controls in response to the signal, so as to control heat buildup within the bearings of the rotors without crewmember input. This may occur during all flight conditions or may be limited to periods when the aircraft is being controlled by an autopilot portion of FCS 67.

The signal may also be communicated to a record storage system 69, which can be configured to generate records of at least one characteristic of the signal. The records generated may include, for example, temperature values for rotor bearings and external (ambient) air temperature, and these values may be used to plot temperature versus time or rates of change of temperature. Data stored by system 69 can be used, for example, by crewmembers or flight-training personnel to evaluate crewmember performance or by maintenance personnel to determine if bearings require inspection or replacement.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A bearing providing for measurement of internal heat generated during use, comprising:
   a laminated elastomeric bearing, comprising layers of elastomeric material and layers of metal;
   a tab located on a periphery of one of the layers of metal and protruding from the bearing; and
   a thermoelectric device coupled to the tab;

wherein heat generated within the bearing during use is conducted to the tab and to the thermoelectric device, allowing for measurement of the heat.

2. The bearing of claim 1, wherein multiple tabs are located on one layer of metal.

3. The bearing of claim 1, wherein at least one tab is located on each of multiple layers of metal.

4. The bearing of claim 1, wherein the tab is insulated from ambient conditions external to the bearing.

5. A rotor assembly for an aircraft, comprising:
a rotor hub having a laminated elastomeric gimbal bearing, the bearing comprising layers of elastomeric material and layers of metal;
a tab located on a periphery of one of the layers of metal and protruding from the bearing; and
a thermoelectric device coupled to the tab;
wherein heat generated within the bearing during gimbaling of the rotor hub is conducted to the tab and to the thermoelectric device, allowing for measurement of the heat.

6. The rotor assembly of claim 5, wherein multiple tabs are located on one layer of metal.

7. The rotor assembly of claim 5, wherein at least one tab is located on each of multiple layers of metal.

8. The rotor assembly of claim 5, wherein the tab is insulated from ambient conditions external to the bearing.

9. An aircraft, comprising:
a rotor hub coupled to the aircraft through a laminated elastomeric gimbal bearing, the bearing comprising layers of elastomeric material and layers of metal;
a tab located on a periphery of one of the layers of metal and protruding from the bearing; and
a thermoelectric device coupled to the tab;
wherein heat generated within the bearing during gimbaling of the rotor hub is conducted through the tab and to the thermoelectric device, the device generating a signal associated with a temperature value for indicating the amount of heat within the bearing.

10. The aircraft of claim 9, further comprising:
an electronic indication system;
wherein the signal is communicated to the indication system, and the indication system generates a visual or audible indication in response to the signal.

11. The aircraft of claim 9, further comprising:
an electronic flight control system;
wherein the signal is communicated to the flight control system, and the flight control system commands at least one flight control in response to the signal.

12. The aircraft of claim 9, further comprising:
an electronic storage system;
wherein the signal is communicated to the storage system, and the storage system generates a record of at least one characteristic of the signal.

13. The aircraft of claim 9, wherein multiple tabs are located on one layer of metal.

14. The aircraft of claim 9, wherein at least one tab is located on each of multiple layers of metal.

15. The aircraft of claim 9, wherein the tab is insulated from ambient conditions external to the elastomeric bearing.

16. A system for measuring heat generated within a laminated elastomeric bearing during use of the bearing, the system comprising:
the laminated elastomeric bearing, comprising layers of elastomeric material and layers of metal;
a tab located on a periphery of one of the layers of metal and protruding from the elastomeric bearing; and
a thermoelectric device coupled to the tab;
wherein heat generated within the bearing during use is conducted through the tab to the thermoelectric device, the device generating a signal associated with a temperature value for indicating the amount of heat within the bearing.

17. The system of claim 16, further comprising:
an electronic indication system;
wherein the signal is communicated to the indication system, and the indication system generates a visual or audible indication in response to the signal.

18. The system of claim 16, further comprising:
an electronic flight control system;
wherein the signal is communicated to the flight control system, and the flight control system commands at least one flight control in response to the signal.

19. The system of claim 16, further comprising:
an electronic storage system;
wherein the signal is communicated to the storage system, and the storage system generates a record of at least one characteristic of the signal.

20. The system of claim 16, wherein multiple tabs are located on one layer of metal.

21. The system of claim 16, wherein at least one tab is located on each of multiple layers of metal.

* * * * *